Patented May 9, 1944

2,348,565

UNITED STATES PATENT OFFICE 2,348,565

TERPENE RESIN

Emil Ott, Elsmere, Del., assignor to Hercules Powder Company, Wilmington, Del., a corporation of Delaware No Drawing. Application June 14, 1941,
Serial No. 398,061

18 Claims. (Cl. 260—80)

This invention relates to new resinous compositions of matter and to processes for their production. More particularly, it relates to resins prepared by the copolymerization of a terpene with an alicyclic hydrocarbon containing a conjugated system of double bonds and containing between 5 and 8 carbon atoms.

Terpenes have been known to polymerize to products which vary in physical characteristics from viscous oils to soft resins at room temperature. Specifically, when alpha-pinene, dipentene, terpinene, or terpinolene, dissolved in ethylene dichloride, is contacted with a boron trifluoride catalyst for a period of 27 hours at a temperature of 0° C. to 5° C., a polymerized product results which is a viscous oil. When alpha-pinene, on the other hand, is contacted with the same catalyst under similar conditions for 40 hours, a soft resinous product results which has a drop melting point between about 30° C. and about 40° C. Other catalysts and varied conditions for the polymerization may be employed. However, it has been found impossible to produce appreciable yields of resins from the above terpenes having drop melting points above 50° C., and it is unusual that a resin having this maximum melting point is obtained. This condition is quite a disadvantage in connection with the use of these terpene polymers in protective coating compositions. The disadvantage rests in the fact that the use of these materials contributes poor drying properties to the coating compositions. While the use of these terpene polymers as substitutes for ester gum give improved resistance to discoloration under ultraviolet light and improved gas-proofness, etc. to the protective coating compositions containing these ingredients, the drying properties of the coating compositions are so inferior that they constitute a serious impediment to their commercial acceptability.

Furthermore, the alkali resistance of protective coatings containing terpene polymers has been found to be inferior to that of ester gum-containing protective coatings. And although the use of the terpene polymers contributes better water-resistance to the resulting coatings than does ester gum, the water-resistance of protective coatings containing these polymers is inferior to that of coatings containing, for example, rosin modified maleate resins, rosin modified glyptal resins, and urea formaldehyde resins.

Generally, when a terpene or a mixture of terpenes is subjected to conditions which are conducive to polymerization, the polymers formed are of very low order or degree. Actually, the polymers formed are usually the dimer, the trimer and the tetramer along with small amounts of higher polymers. The dimer will usually be found to predominate over the other polymers formed. The significant fact is that the average degree or order of polymerization will generally be rather low. For example, the average degree of polymerization may vary between 2.0 and about 4.0. These values, it will be understood are based on polymerizates which have been treated to remove substantially all of the unpolymerized constituents. In other words, the polymerizates will generally consist substantially entirely of the dimer, trimer, etc., of the constituent or constituents being polymerized with substantially none of the monomer being present.

It is an object of this invention to provide new resinous products which possess generally higher viscosities or melting points, as the case may be, than the polymers of terpenes or terpene mixtures of the prior art. It is a further particular object of the invention to provide new resinous products which are solid at room temperature.

It is a further object to provide terpene-containing resinous polymers which are characterized by their having a relatively high degree of polymerization when compared with the terpene-containing polymers of the prior art.

A further object of the invention is to provide resinous products which are characterized by their possessing good water and alkali resistance. Also, it is an object to prepare resinous products which when incorporated into protective coatings will yield protective films having good water and alkali resistance.

An additional object is to provide resinous products which when incorporated into protective coatings will yield protective films having good drying characteristics. It is particularly desired to exceed the characteristics of protective coatings containing the terpene polymers of the prior art.

Other objects will appear hereinafter.

In accordance with this invention, it has been found that various terpenes or mixtures thereof may be copolymerized with various alicyclic hydrocarbons having conjugated systems of double bonds, such as, cyclopentadiene, etc. The polymerization reaction will be carried out in the presence of a suitable catalyst and under suitable operating conditions to yield resinous materials which have many distinguishing characteristics over the resinous polymers of terpenes or mixtures thereof. These new copolymers are unusual in that they possess generally higher viscosities or melting points, as the case may be, than the resinous polymers produced by the polymerization of terpenes or terpene mixtures. Thus, it is possible in accordance with this invention to prepare products which are viscous liquids or solids which have melting points as determined by the Hercules drop method of from about 20° C. to about 160° C., preferably, between about 50° C. and about 160° C. The average degree of polymerization of these new copolymers will be found to be substantially higher than that of products generally resulting when terpenes or terpene mixtures are polymerized under similar conditions of polymerization.

The new products of this invention are of particular significance to the paint and varnish industry. When incorporated in protective coatings, they impart greatly improved drying properties to the resulting protective films as compared with protective coatings containing the terpene polymers of the prior art. The copolymers themselves have better alkali and water resistance than have the terpene polymers. These properties are also characteristic of protective films formed from coating materials containing the copolymers.

In accordance with this invention, one of the constituents of the mixture which is submitted to conditions of polymerization will be an alicyclic hydrocarbon containing a conjugated system of double bonds and containing between 5 and 8 carbon atoms per molecule. It has been found that of the alicyclic hydrocarbons which may be used, cyclopentadiene, and 1,3-cyclohexadiene are particularly desirable. However, in addition to these compounds, (1,3-cycloheptadiene), (1,3,5 - cycloheptatriene), (1,3 - cyclooctadiene), (1,3,5 - cyclooctatriene), (1,3,6 - cyclooctatriene), and (1,3,5,7-cyclooctatetraene) may be employed. In certain instances, polymeric modifications of the above compounds may be equivalently employed. Thus, for example, dimeric cyclopentadiene may be used. In addition, alkyl substitution products of the above unsaturates may be employed. However, they are less preferable.

Now, in accordance with the present inventive processes, the terpene constituent may be selected from a large group of operable materials. Any terpene hydrocarbons having the empirical formula $C_{10}H_{16}$, or a mixture thereof, may be copolymerized with an alicyclic hydrocarbon having a conjugated system of double bonds to produce new resinous products in accordance with the invention. Thus, for example, I may employ acyclic terpenes, such as, myrcene, ocimene, allo-ocimene, cryptotaenene, etc.; monocyclic terpenes, such as, dipentene, alpha-terpinene, beta-terpinene, gamma-terpinene, terpinolene, sylvestrene, alpha-phellandrene, beta-phellandrene, origanene, the pyronenes, etc.; bicyclic terpenes, such as, alpha-thujene, beta-thujene, sabinene, the carenes, alpha-pinene, beta-pinene, camphene, bornylene, alpha-fenchene, beta-fenchene, gamma-fenchene, etc.

In place of pure terpenes or their synthetic mixtures, it is possible to employ natural terpene mixtures. Thus, for example, it is possible to employ either wood or gum turpentine. Wood and gum turpentine contain high percentages of alpha-pinene, small percentages of monocyclic terpenes, and in the case of gum turpentine, beta-pinene. Both wood and gum turpentine make excellent raw materials to employ in accordance with the invention. Other fractions containing crude mixtures of various terpenes obtained as a result of the recovery of oleoresinous material from pine wood may be employed. One such commercially available terpene-containing mixture is known as "Solvenol." This particular mixture contains the monocyclic terpene hydrocarbons, terpinene, terpinolene and dipentene. Other terpene mixtures which may be employed are those obtained in the heat isomerization of alpha- and/or beta-pinene. When, for example, alpha-pinene is heated at elevated temperatures, it is possible to obtain products containing as much as 40% allo-ocimene along with substantial amounts of alpha-pinene, dipentene and other complex terpene products. Still further, it is possible to employ terpene mixtures obtained in the synthesis of ethers and alcohols from alpha- and beta-pinene. Any of these mixtures containing substantial quantities of terpenes may be suitably employed as the terpene raw materials of the present invention.

In accordance with the present invention, a mixture of a terpene and an alicyclic hydrocarbon having a conjugated system of double bonds, desirably in the presence of a suitable inert solvent, is contacted with a suitable polymerization catalyst at a temperature which promotes copolymerization of the constituents for a period sufficiently long to secure a substantial yield of copolymerized product. Desirably, the reaction mixture will be vigorously agitated throughout the period of contact of the reactants with the catalyst.

The polymerization catalysts which will be employed in accordance with this invention can be categorized into three distinct groups. These groups comprise the metal halides, such as, boron trifluoride and its molecular complexes with ethers and acids, titanium chloride, ferric chloride, and the halides of metals whose hydroxides are amphoteric, as aluminum chloride, stannic chloride, zinc chloride, etc.; acids, such as, hydrofluoric acid, fluoroboric acid, polybasic mineral acids, as orthophosphoric acid, tetraphosphoric acid, sulfuric acid, etc., acyl sulfuric acids, as acetyl sulfuric acid, alkyl sulfuric acids, as ethyl sulfuric acid, para-toluene sulfonic acid, etc.; and activated clays, such as, fuller's earth, diatomaceous earth, alumina, bauxite, synthetic magnesium silicates, etc. For the acid catalysts, certain of their anhydrides, for example, phosphorus pentoxide, may be equivalently employed. The activated clays will desirably be calcined at temperatures of, for example, from 100° C. to 500° C. prior to use.

Although any of the above catalysts may be employed in accomplishing the copolymerization inherent in the present invention, definitely superior results are obtained with the use of anhydrous metallic halides, preferably aluminum chloride, as catalysts. The use of such catalysts generally results in the production of solid products.

It will be realized that the catalyst to reactant ratio, reaction temperature, and reaction time, may be varied widely and cannot be precisely ascertained. This results from the fact that with certain catalysts, small quantities are responsible for some definite reaction even though it be slight. However, as a practical matter the operable limits for the present invention have been ascertained beyond which it would not be economically desirable to operate. Hence, generally, in accordance with the invention, the catalyst to reactant ratio may vary between about 0.02 and about 1.0. The operable temperature may vary from about −60° C. to about 200° C., and the operable reaction period will vary from about 1 hour to about 250 hours. Moreover, it is preferred when a metal halide or acid catalyst is employed, to use a catalyst to reactant ratio between about 0.02 and about 0.25, a reaction temperature between about −20° C. and about 80° C., and a reaction period between about 2 hours and about 24 hours. When an activated clay is employed as the catalyst, it is preferred to use a catalyst to reactant ratio between about 0.05 and about 0.25, a reaction temperature between about 80° C. and about 200° C., and a reaction period between about 6 and about 24 hours.

In accordance with this invention, the metal halide catalysts are preferred where the object is the production of resinous copolymers which are solid at room temperature. It is further preferred that the metal halide catalyst be employed in conjunction with a halogenated inert solvent for the reactants. It has been found that when a metal halide catalyst is employed for the copolymerization in conjunction with an inert solvent, employing a catalyst to reactant ratio, a temperature and a reaction period within the broad operable ranges disclosed hereinabove, generally solid polymers will result. It will be understood, however, that although metal halides are preferably employed in producing resinous copolymers which are solid at room temperature in accordance with this invention, it is quite possible that solid polymers may result from the employment of the other catalysts disclosed herein.

The ratio of terpene to alicyclic hydrocarbon having a conjugated system of double bonds may vary widely, depending upon the particular compounds under consideration. However, generally, it is preferred to employ the terpene in an amount between about 5% and about 95% of the total weight of the reactants, with the alicyclic hydrocarbon being employed in a corresponding amount of between about 95% and about 5% of the total weight of the reactants. It has been found that as the proportion of unsaturated alicylic hydrocarbons is increased, the resulting copolymers tend to have higher melting points.

Variations in the ratios of terpene to unsaturated alicyclic hydrocarbons will influence the type of catalyst required to produce solid polymers from the copolymerization. For example, the lower the aforesaid ratio the milder may be the copolymerization catalyst. Thus, the acid catalysts and the activated clay catalysts may be employed. However, as the ratio increases, the metal halides are required to obtain solid products.

The inert solvents which may be employed in accordance with this invention generally comprise any organic liquid which is inert to the reactants and catalyst employed. Thus, aliphatic hydrocarbons, such as, gasoline, petroleum naphtha, butane, pentane, etc.; aromatic hydrocarbons, such as, benzene, toluene, xylene, etc.; cyclic hydrocarbons, such as, cyclohexane, decahydronaphthalene, etc.; esters, such as, methyl acetate, ethyl acetate, propyl acetate, isopropyl acetate, n-butyl acetate, etc.; halogenated hydrocarbons, such as, chloroform, ethylene dichloride, carbon tetrachloride, trichloroethylene, ethyl chloride, etc. In conjunction with the use of metal halide catalysts, the halogenated and the aromatic solvents are preferred, with the halogenated solvents, such as, ethyl chloride, and ethylene dichloride, being most preferred.

Following the reaction period, employing the conditions as hereinabove described, the reaction mixture is suitably treated to recover the copolymerized product as determined by the particular procedure employed in accomplishing the reaction. Thus, when a metal halide or acid catalyst has been employed, the catalyst may be removed by washing the reaction mixture with water or an aqueous alkali or an aqueous acid. The aqueous acid wash often facilitates the removal of metal halide catalysts from the rection mixture since it greatly assists in decomposing complexes which the catalyst has formed with unsaturated centers of the materials with which it has come in contact. Following the alkali or acid washes, it is desirable to wash with water to remove all traces of alkali or acid. The solvent, if one has been used, and any unreacted constituents are removed, desirably by means of steam or vacuo distillation using, if necessary, a final bath temperature of about 200 to 220° C.

An alternative method for recovery of the copolymer after the catalyst has been removed is to dilute the reaction mixture with an organic liquid which is miscible with the inert solvent employed in the reaction but in which the copolymer is insoluble. By vigorous agitation, the solid copolymer is precipitated from the solution in the form of powder or granules. For example, ethyl alcohol or acetone may be employed with many of the copolymers prepared in accordance with this invention.

The color of the final products may be improved by utilizing terpenes which have been distilled from caustic. Also, the use of an inert atmosphere such as $CO_2$, $N_2$, etc., during the reaction leads to the production of pale colored products. Further refinement of the products may be accomplished by treatment with adsorbents such as silica gel, fuller's earth, bauxite, activated carbon, etc. This treatment removes traces of combined catalysts and in many cases further bleaches the products. It may be employed either before or after removal of the solvent. Other refining agents which may be employed include selective solvents, such as, furfural, furfuryl alcohol, phenol, etc. In addition, the copolymers may be bleached by heating at a temperature of 275° C. to 325° C. for from 5 minutes to 30 minutes, desirably, in an inert atmosphere. If desired, the copolymer resins obtained as described herein may be vacuum distilled to remove the lower copolymers to yield resins having higher melting points.

There follow several specific examples which illustrate particular embodiments of the principles of this invention which, however, are in no way to be construed as being limiting. All parts and percentages are by weight unless otherwise indicated.

Examples 1 to 5

In these examples, the terpene or terpene mixture and cyclopentadiene were dissolved in ethylene dichloride. Anhydrous aluminum chloride was then added at a temperature of 0° C. to 10° C. with accompanying agitation and cooling to maintain the temperature between 0° C. and 10° C. After standing for a suitable period, the reaction mixtures were steam distilled at 100° C. to remove the ethylene dichloride. The resulting products were redissolved in benzene, washed with hot aqueous 8% HCl, and then with water. The benzene was thereafter removed by reduced pressure distillation using a final bath temperature of 190° C. and a pressure of 20 mm. Further reaction conditions and characteristics of the products obtained are given in the following tabulation:

| Terpene, parts | Cyclopentadiene | Solvent | Catalyst | Time | Temp. | Yield | Color rosin scale | Drop melting point |
|---|---|---|---|---|---|---|---|---|
| | Parts | Parts | Parts | Hours | °C. | Parts | | |
| Wood turpentine, 90 | 10 | 200 | 6 | 24 | 0.10 | 91 | F | 78° C. |
| Wood turpentine, 70 | 30 | 200 | 6 | 24 | 0-10 | 74 | Brown | 117° C. |
| Dipentene,[1] 100 | 25 | 250 | 3 | 24 | 0-10 | 64 | G | 92° C. |
| Dipentene, 100 | 50 | 250 | 3 | 24 | 0-10 | 35 | D | 134° C. |
| Dipentene, 100 | | 200 | 3 | 24 | 0-10 | 60 | WW | (Liquid) |

[1] A product obtained as a high end from the fractional distillation od wood turpentine containing approximately 75% dipentene and 25% other terpenes.

Example 6

Three parts of anhydrous aluminum chloride were added over a period of 5 minutes with agitation to a solution of 60 parts of alpha-pinene and 30 parts of dicyclopentadiene in 200 parts of ethylene dichloride. The temperature of the solution during the addition was maintained at 50° C. The reaction mixture was then allowed to stand for a period of 16 hours at 5° C. Thereafter, it was washed with aqueous 10% hydrochloric acid, then with water. The ethylene dichloride and unreacted constituents were removed by vacuum distillation, using a final bath temperature of 190° C. and a pressure of 20 mm. Seventy-five parts of copolymer resin remained, having a drop melting point of 70° C. and a color of F on the rosin scale.

Example 7

One hundred parts of alpha-pinene and 40 parts of 1,3-cyclohexadiene were dissolved in 200 parts of toluene. Approximately 15 parts of gaseous boron trifluoride were absorbed in the solution over a period of one-half hour with vigorous agitation at 5 to 10° C. The reaction mixture was then allowed to stand for 24 hours at 5° C. The mixture was water washed to remove the boron trifluoride, and the toluene and unreacted constituents were removed by vacuum distillation as in Example 6. There resulted 120 parts of a viscous resin, having a drop melting point of 58° C. and a color of N on the rosin scale.

Example 8

Ten parts of beta-pinene and 5 parts of 1,3-cyclohexadiene were dissolved in 20 parts of ethyl chloride. Two parts of anhydrous aluminum chloride were added over a period of one-half hour with vigorous agitation at a temperature of −60° to −30° C. Agitation was then continued for a period of 3 hours at −60° C. The reaction mixture was slowly added to 400 parts of 95% ethyl alcohol with vigorous agitation at 25 to 30° C. over a period of one-half hour. The precipitate was filtered off, washed with 95% ethyl alcohol and then dried in vacuo. The product, a light yellow colored granular copolymer, was obtained in the amount of 12 parts and had a drop melting point of 120° C.

Example 9

Fifty parts of wood turpentine, 20 parts of cyclopentadiene, 40 parts of 85% orthophosphoric acid, and 50 parts of toluene were placed in a stainless steel rocking-type autoclave. The mixture was agitated for a period of 36 hours at 80 to 100° C. After cooling, the reaction mixture was washed with water at 70° C. to remove the catalyst. The toluene and unreacted constituents were removed by vacuum distillation as in Example 7. There remained 60 parts of copolymer resin in the form of a viscous oil, having a color of F on the rosin scale.

Example 10

The processes of Example 9 were duplicated with the exception that the orthophosphoric acid was replaced with 50 parts of calcined fuller's earth and the reaction temperature was 125 to 180° C. The catalyst was removed by filtration; the toluene and unreacted constituents were removed as in Example 7. The product was obtained in the amount of 40 parts and was a viscous oil, having a color of I on the rosin scale.

The resinous copolymers prepared in accordance with this invention are characterized by their having heavier viscosities or higher melting points, as the case may be, than the polymers prepared from various terpenes or terpene mixtures of the prior art. By employing the proper conditions, copolymers can be prepared which range in melting point from about 20° C. up to about 160° C. These solid resins have an extended scope of utility over the terpene polymers which are generally found to be viscous oils and semi-solids at room temperature. The new copolymers of this invention show good resistance to water and to alkalies. These characteristics are also found in films formed from protective coatings containing these new resins. In this respect they are markedly superior to protective coatings prepared from terpene polymers as the resin ingredient. Furthermore, protective coating compositions containing the resinous copolymers of this invention have excellent drying characteristics, particularly when compared with those of compositions prepared from terpene polymers.

Both the solid and liquid copolymers adhere well to various surfaces, such as, wood, glass, paper, or metal. Hence, the resins are very useful in the form of their clear solutions in the lacquer, varnish and adhesive fields. They may also be used in the formulation of pigmented coating compositions, such as, paints and pigmented lacquers for wood, metal, paper, etc. Unpigmented solutions or emulsions of the copolymer resins are suitable for impregnating or coating paper, textiles, fibers, wood, etc.

The solubility characteristics of these new resins are such that they may be dissolved in common solvents, such as, benzene, toluene, gasoline, chlorinated hydrocarbons, etc. They are only slightly soluble in solvents, such as, ethyl alcohol, acetone, etc.

It will be understood that wherever in this specification the degree of polymerization is referred to, there is contemplated the average number of polymerizable units which are attached in some manner to each other as a result of the polymerization process. Thus, for example, if 50% of the total polymerizable material employed is converted as a result of polymerization to units each of which contains two of the polymerizable units existing prior to polymerization, whereas the remainder or 50% of the total polymerizable material is converted to units each of which contains three of the polymerizable units existing prior to polymerization, then the average degree of polymerization will be 2.5.

It will be understood that wherever in this specification reference is made to the melting point of a resinous material, a melting point as determined by the Hercules drop method is contemplated.

It will be understood that the details and examples hereinbefore set forth are illustrative only and that the invention as broadly described and claimed is in no way limited thereby.

What I claim and desire to protect by Letters Patent is:

1. The process which comprises copolymerizing a mixture consisting of a terpene and an alicyclic hydrocarbon containing a conjugated system of double bonds having between 5 and 8 carbon atoms, both of which reactants are dissolved in an inert solvent, in the presence of a catalyst active at the polymerization temperature, at a temperature between about −60° C. and about 200° C. whereby a resinous product is obtained characterized as being alkali resistant and having a melting point between about 58° C. and about 134° C.

2. The process which comprises copolymerizing a mixture consisting of a terpene and an alicyclic hydrocarbon containing a conjugated system of double bonds having between 5 and 8 carbon atoms, both of which reactants are dissolved in an inert solvent, in the presence of a metal halide catalyst active at the polymerization temperature, at a temperature between about −60° C. and about 200° C. whereby a resinous product is obtained characterized as being alkali resistant and having a melting point between about 58° C. and about 134° C.

3. The process which comprises copolymerizing a mixture consisting of a terpene and an alicyclic hydrocarbon containing a conjugated system of double bonds having between 5 and 8 carbon atoms, both of which reactants are dissolved in an inert solvent in the presence of a metal halide catalyst active at the polymerization temperature, at a temperature between about −20° C. and about 80° C. whereby a resinous product is obtained characterized as being alkali resistant and having a melting point between about 58° C. and about 134° C.

4. The process which comprises copolymerizing a mixture consisting of a terpene and an alicyclic hydrocarbon containing a conjugated system of double bonds having between 5 and 8 carbon atoms, both of which reactants are dissolved in an inert halogenated solvent in the presence of a metal halide catalyst active at the polymerization temperature, at a temperature between about −20° C. and about 80° C. whereby a resinous product is obtained characterized as being alkali resistant and having a melting point between about 58° C. and about 134° C.

5. The process which comprises copolymerizing a mixture consisting of a terpene and an alicyclic hydrocarbon containing a conjugated system of double bonds having between 5 and 8 carbon atoms, both of which reactants are dissolved in an inert solvent, in the presence of an acid catalyst active at the polymerization temperature, at a temperature between about −60° C. and about 200° C. whereby a resinous product is obtained characterized as being alkali resistant and having a melting point between about 58° C. and about 134° C.

6. The process which comprises copolymerizing a mixture consisting of a terpene and an alicyclic hydrocarbon containing a conjugated system of double bonds having between 5 and 8 carbon atoms, both of which reactants are dissolved in an inert solvent, in the presence of an acid catalyst active at the polymerization temperature, at a temperature between about −20° C. and about 80° C. whereby a resinous product is obtained characterized as being alkali resistant and having a melting point between about 58° C. and about 134° C.

7. The process which comprises copolymerizing a mixture consisting of a terpene and an alicyclic hydrocarbon containing a conjugated system of double bonds having between 5 and 8 carbon atoms, both of which reactants are dissolved in an inert solvent, in the presence of an activated clay as a catalyst active at the polymerization temperature, at a temperature between about −60° C. and about 200° C. whereby a resinous product is obtained characterized as being alkali resistant and having a melting point between about 58° C. and about 134° C.

8. The process which comprises copolymerizing a mixture consisting of a terpene and an alicyclic hydrocarbon containing a conjugated system of double bonds having between 5 and 8 carbon atoms, both of which reactants are dissolved in an inert solvent, in the presence of an activated clay as a catalyst active at the polymerization temperature, at a temperature between about −20° C. and about 80° C. whereby a resinous product is obtained characterized as being alkali resistant and having a melting point between about 58° C. and about 134° C.

9. The resinous product produced in accordance with claim 1.

10. The resinous product produced in accordance with claim 1, but where the terpene is monocyclic.

11. The resinous product produced in accordance with claim 1, but where the terpene is dipentene and the alicyclic hydrocarbon is cyclopentadiene.

12. The resinous product produced in accordance with claim 1, but where the terpene is bicyclic.

13. The resinous product produced in accordance with claim 1, but where the terpene is bicyclic and the alicyclic hydrocarbon is cyclopentadiene.

14. The resinous product produced in accordance with claim 1, but where the terpene is bicyclic and the alicyclic hydrocarbon is 1,3-cyclohexadiene.

15. The resinous product produced in accordance with claim 1, but where the terpene is turpentine and the alicyclic hydrocarbon is cyclopentadiene.

16. The resinous product produced in accordance with claim 1, but where the terpene is turpentine and the alicyclic hydrocarbon is 1,3-cyclohexadiene.

17. The resinous product produced in accordance with claim 1, but where the terpene is alpha-pinene and the alicyclic hydrocarbon is cyclopentadiene.

18. The resinous product produced in accordance with claim 1, but where the terpene is alpha-pinene and the alicyclic hydrocarbon is 1,3-cyclohexadine.

EMIL OTT.

CERTIFICATE OF CORRECTION.

Patent No. 2,348,565. May 9, 1944.

EMIL OTT.

It is hereby certified that error appears in the printed specification of the above numbered patent requiring correction as follows: Page 4, in the table, sixth column thereof, for "0.10" read -- 0-10 --; page 5, second column, line 74, claim 18, for "cyclohexadine" read --cyclohexadiene--; and that the said Letters Patent should be read with this correction therein that the same may conform to the record of the case in the Patent Office.

Signed and sealed this 13th day of June, A. D. 1944.

Leslie Frazer (Seal) Acting Commissioner of Patents.